United States Patent [19]
Shaw

[11] Patent Number: 6,121,974
[45] Date of Patent: Sep. 19, 2000

[54] PRIORITY STORAGE SYSTEM FOR FAST MEMORY DEVICES

[75] Inventor: Christopher William Shaw, Austin, Tex.

[73] Assignee: Cirrus Logic, Inc., Fremont, Calif.

[21] Appl. No.: 08/670,299

[22] Filed: Jun. 27, 1996

[51] Int. Cl.[7] .................................................. G06T 11/00
[52] U.S. Cl. ........................................................ 345/430
[58] Field of Search .................................. 395/119–130; 345/419–430

[56] References Cited

U.S. PATENT DOCUMENTS

| | | | |
|---|---|---|---|
| 4,692,880 | 9/1987 | Merz et al. | 364/521 |
| 4,727,365 | 2/1988 | Bunker et al. | 340/728 |
| 5,191,642 | 3/1993 | Quick et al. | 395/127 |
| 5,548,709 | 8/1996 | Hannah et al. | 395/161 |
| 5,680,363 | 10/1997 | Dosaka et al. | 365/230.03 |

OTHER PUBLICATIONS

Goris et al. "A Configurable Pixel Cache For Fast Image Generation" IEEE CG&A pp. 24–32, 1987.

*Primary Examiner*—Almis R. Jankus
*Attorney, Agent, or Firm*—Robert V. Wilder; Steven A. Shaw

[57] ABSTRACT

A process and implementing computer system for graphics applications in which information files such as texture maps (TMs) are prioritized and stored in a relatively fast local memory. The method of prioritization includes initially sorting the information files by order of the frequency with which corresponding graphics primitive elements are called by the application. The priority is adjusted such that the smaller TMs get an increase in their priority so that more TMs may be placed in faster graphics memory. Thereafter among similarly prioritized groups of information files, the larger of the files are first stored in the fast local memory and the remaining files are marked for storage in the system memory after the fast local memory has been fully utilized. A searching routine enables an identification of available or free storage space in the local memory and the method further compares individual texture map files with available free memory space to optimize storage of the texture maps on a priority basis to the fast local memory.

25 Claims, 7 Drawing Sheets

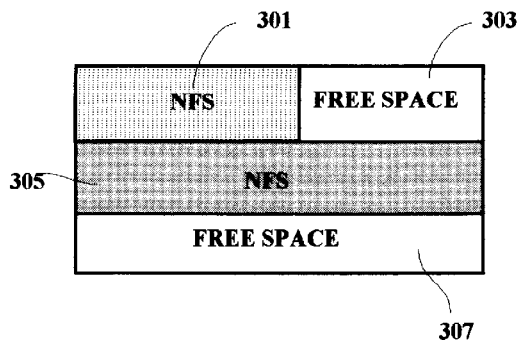
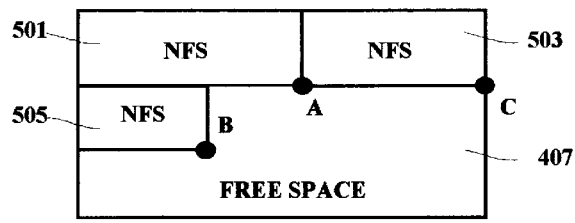
FIG. 3  FIG. 4
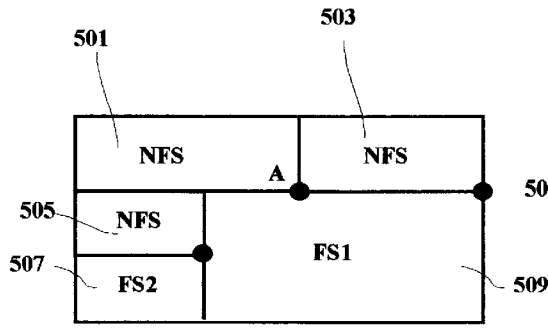
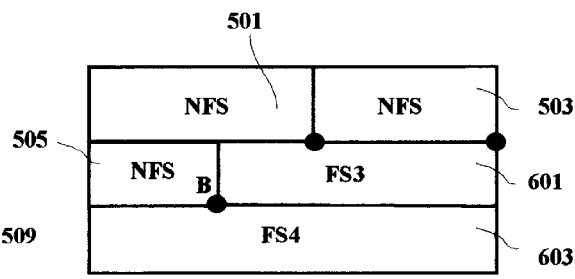
FIG. 5  FIG. 6
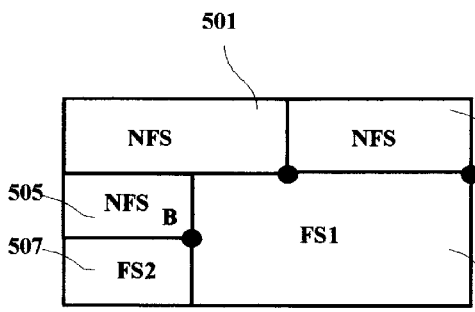
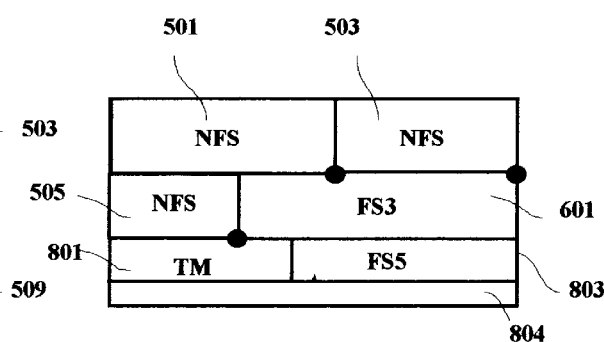
FIG. 7  FIG. 8

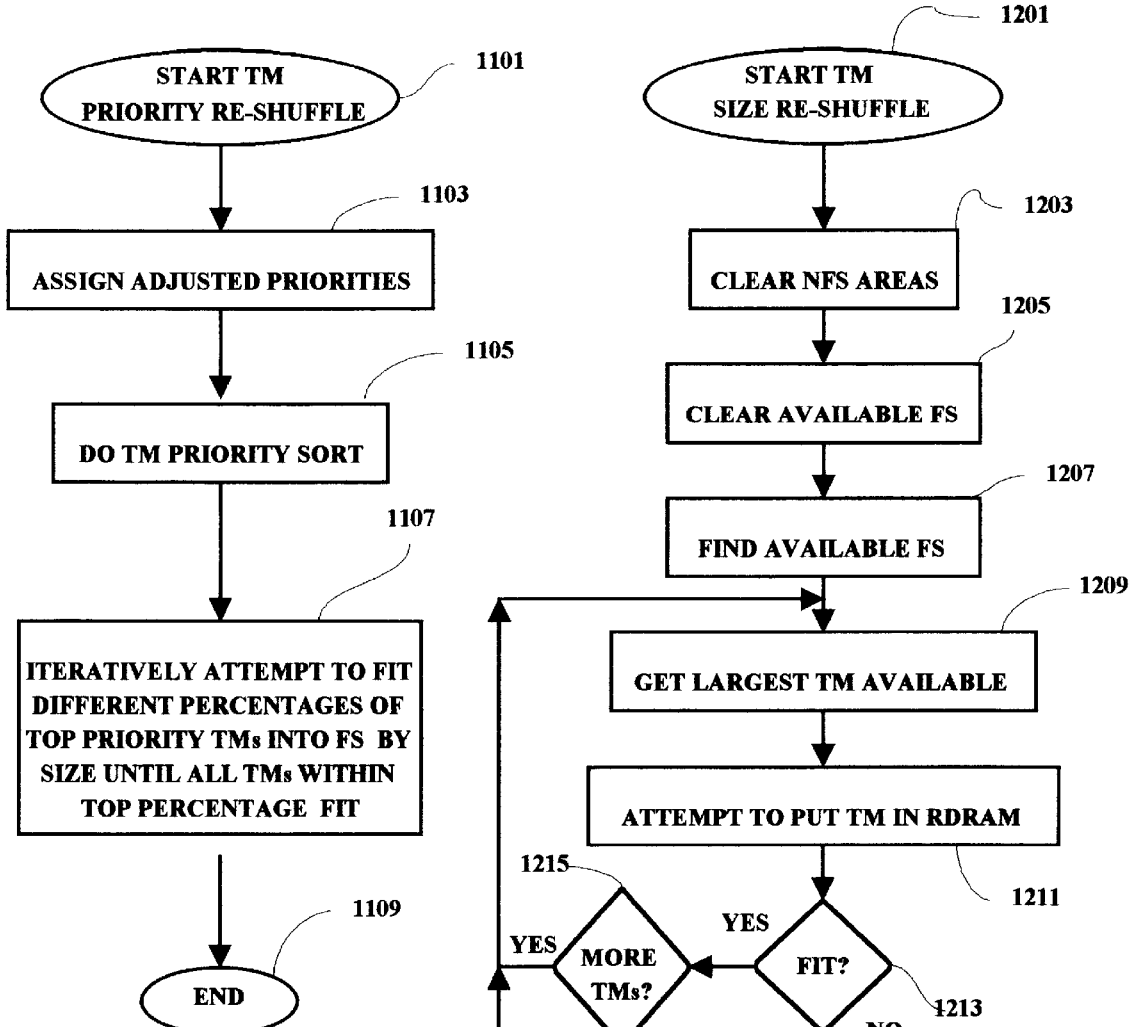
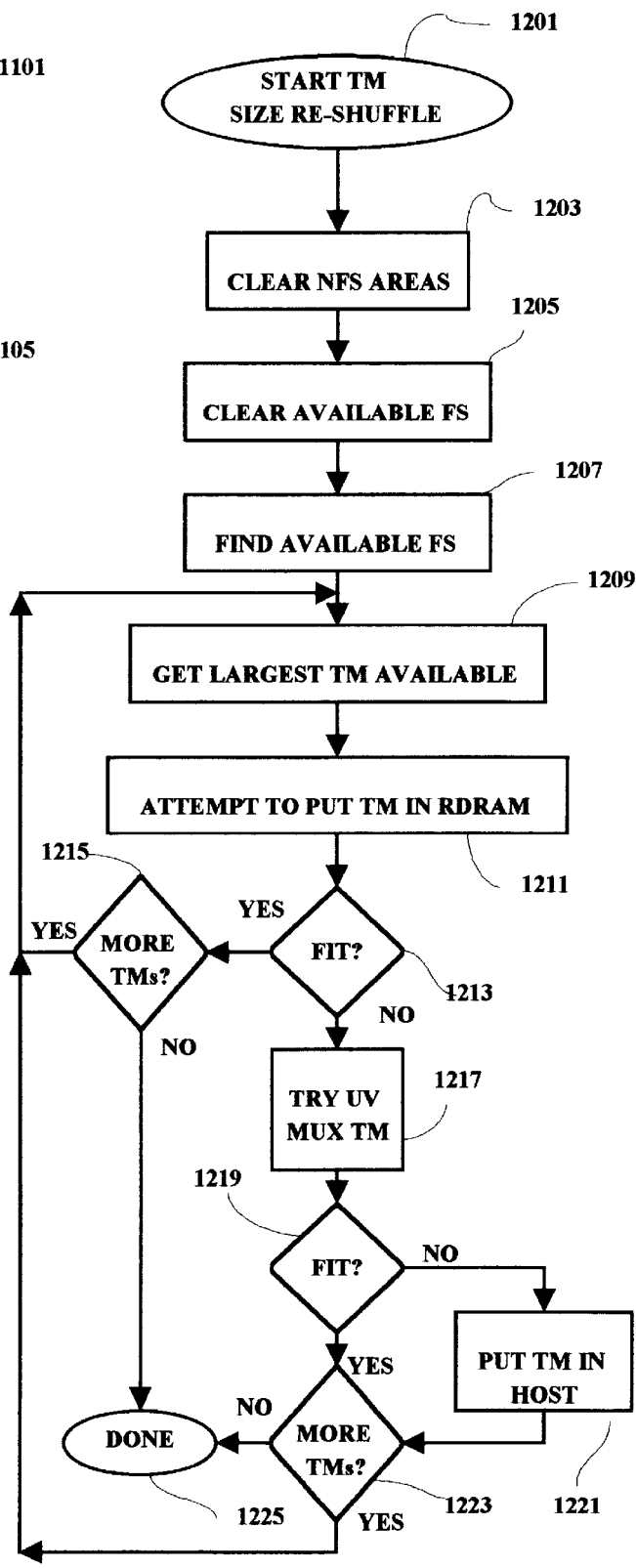
FIG. 11
FIG. 12

PRIORITY STORAGE SYSTEM FOR FAST MEMORY DEVICES

FIELD OF THE INVENTION

The present invention relates generally to computer graphics and more particularly to information storage and processing methods for graphics systems with optimized memory mapping.

BACKGROUND OF THE INVENTION

The use and application of computer graphics to an increasing number of systems environments continues to grow. This growth has been accelerated to an even greater extent with the availability of faster and faster information processing, storage, memory and retrieval devices. The speed of operation of such devices remains a high priority design objective. This is especially true in a graphics system and even to a greater extent with 3D graphics systems. Such graphics systems require a great deal of processing for huge amounts of data and the speed of data flow is critical in providing a new product or system or in designing graphics systems to apply to new uses.

In the field of computer graphics, many methods exist to draw polygons into a pixel grid. Polygons are used as drawing primitives for many applications such as Graphical User Interfaces, Computer Aided Design and 3D Computer Animation. Most techniques for drawing polygons reduce the polygon to a series of scan lines that align to the edges of the polygon and to the pixel grid. When these methods are implemented in hardware, the pixel grid is generally accessed in a sequential method, i.e. for each XY pixel access, the pixel grid is updated based on the XY address. For a pixel grid that has a large set-up time per pixel update, this can become a time bottleneck for the entire system.

In all data and information processing systems, and especially in computer graphics systems, much time is consumed in accessing data blocks from a memory or storage location, then processing that information and sending the processed information to another location for subsequent retention, access, processing and/or display. As the speed of new processors continues to increase, access time for accessing and retrieving data from memory is becoming more and more of a bottleneck in terms of system speed.

Graphic systems must be capable of performing more sophisticated functions in less time in order to process greater amounts of graphical data required by modern software applications. There is a continuing need for improvements in software methods and hardware implementations to draw three-dimensional objects using full color, shading, texture mapping and transparency blending. The development of raster display systems has dramatically reduced the overall cost and increased the capabilities of graphic systems. In a raster display system, a set of horizontal or orthogonal scan lines, each comprising a row of pixels, forms an array or grid of pixels to represent the entire screen area. The screen is preferably a cathode ray tube (CRT) or liquid crystal display (LCD) or the like capable of scanning the entire pixel grid at a relatively high rate to reduce flicker as much as possible.

The pixel data is preferably stored in a frame buffer comprising dynamic random access memories (DRAMs), where each pixel is represented by one or more bits depending upon the desired resolution, color, brightness and other variables. Typical display systems can draw screens with multiple colors with a variety of screen resolutions, such as, but not limited to, 640×480, 800×600, 1024×768, 1280× 1024, or other combinations depending upon the software drivers and the hardware used. A video controller scans and converts the pixel data in the frame buffer to the control signals required by the screen system to display the information on the screen. The video controller scans each of the pixels sequentially, from top to bottom and from left to right, and converts pixel data into intensity values for corresponding pixels on the screen. In a color graphics system using a CRT, three separate beams are controlled i.e. one beam each for each of the primary colors, where the intensity of each of the beams is determined by the pixel value corresponding to the respective colors. A similar system is used for LCD devices. Each pixel value may comprise, for example, 24 bits, i.e. one 8-bit byte for each of the primary colors red, green and blue, where the byte value determines the intensity of the respective color to be displayed.

A pixel grid in memory is a representation of two dimensional space in a linear accessed memory. Linear accessed memory has incrementing addresses for each location in memory i.e. a one dimensional space. A two dimensional space can be represented in one dimensional addressing by creating a pitch value to the "Y" parameter, i.e. for each increment in "Y", a number of pixel grid locations exist in "X". This allows a linear address to be calculated from a two dimensional XY pixel grid access. Most methods for drawing to a pixel grid use the above method to access a pixel grid. The XY mapping is fixed at the time the polygons are being drawn based on the current two dimensional pixel grid in memory. From that point on, the pixel grid, unless noted otherwise, will be assumed to be a fixed two dimensional representation of a pixel grid in linear addressed memory.

A polygon is represented as a set of points in the pixel grid that map to the intersection of the polygon to be drawn. The definition of most lines and polygons are continuous functions that can only be approximated by the pixel grid. Polygons in computer graphics are generally drawn by decomposing the definition of the polygon to a set of boundary conditions called vertex points that represent approximations of the end points of the polygon into a pixel grid. Those vertex points are then decomposed to a set of scan lines for each Y scanning in the X direction for each pixel in the X direction contained within the polygon.

With specific reference to computer graphics applications, representations of images are stored in pixel-oriented frame buffers or display memory which may be implemented as Rambus-based DRAM (RDRAM). The frame of reference for the video buffers is a zero point relative to a matrix of storage positions for storing pixel values and information related to the pixel characteristics which define an image to be displayed. That zero point storage position corresponds to a zero point pixel position on a display screen utilized to display the image comprised of the stored pixels. A string or row of data from the buffer corresponds to a row of pixels on the display screen. As an image is refreshed on a display screen, each line of data stored in the video memory is sequentially accessed from memory and transferred to the display device to fill-in corresponding sequential lines of pixels on the display. Each such access and transfer has a delay time associated therewith which has heretofore been relatively unalterable because of the inherent dependence of the storing process on the scanning process, i.e. the initiation of each line of storage begins with the left-most pixel of each display scan line regardless of the position in the scan line which contains the first bit of image definition.

Also, in storing and retrieving information, delay is introduced when data has to be stored in and retrieved from system memory rather than the relatively faster RDRAM memory of the graphics subsystem. The graphics subsystem includes a relatively fast local memory or RDRAM which is faster than the system memory. Processing inefficiencies occur when information blocks cannot be accommodated by the fast local memory and have to be transferred to the system memory. Subsequently, when access to that information is needed, the fast graphics system must wait on the slower access from the system memory before processing and displaying any information that had to be stored on the system memory. Moreover, even when some system storage is unavoidable due to the data overhead of graphics applications, in the past there has not been any attempt to prioritize the data by types in order to optimize storage and retrieval times for the fast RDRAM and the relatively slower system memories.

Thus there is a need for an improved graphics information storage method and apparatus for storing texture map information by various information characteristics such that the storage destination is determined according to predetermined characteristics of the texture map data in order to minimize data storage and retrieval times.

SUMMARY OF THE INVENTION

An improved graphics information storage and retrieval method and apparatus is provided which stores information and data files or maps on an access priority or size basis to a local fast memory prior to sending such files to system memory for storage and retrieval, such that data files which are called for more frequently are stored in local memory and further prioritized on a size basis such that among data files having similar high priority access frequency, smaller data files are stored first in local memory and larger files of the same priority are stored in system memory after free memory space in the local memory has been utilized.

BRIEF DESCRIPTION OF THE DRAWINGS

A better understanding of the present invention can be obtained when the following detailed description of a preferred embodiment is considered in conjunction with the following drawings, in which:

FIG. 3 is a memory map illustrating a typical memory configuration;

FIG. 4 is a memory map useful in explaining one aspect of the operation of the present example;

FIG. 5 is a memory map useful in explaining one aspect of the operation of the present example;

FIG. 6 is a memory map useful in explaining one aspect of the operation of the present example;

FIG. 7 is a memory map useful in explaining one aspect of the operation of the present example;

FIG. 8 is a memory map useful in explaining one aspect of the operation of the present example;

FIG. 11 is a flowchart showing a re-shuffle routine implemented in the present example;

FIG. 12 is a flowchart illustrating another re-shuffle routine used in the present example;

DETAILED DESCRIPTION

Figure 1:
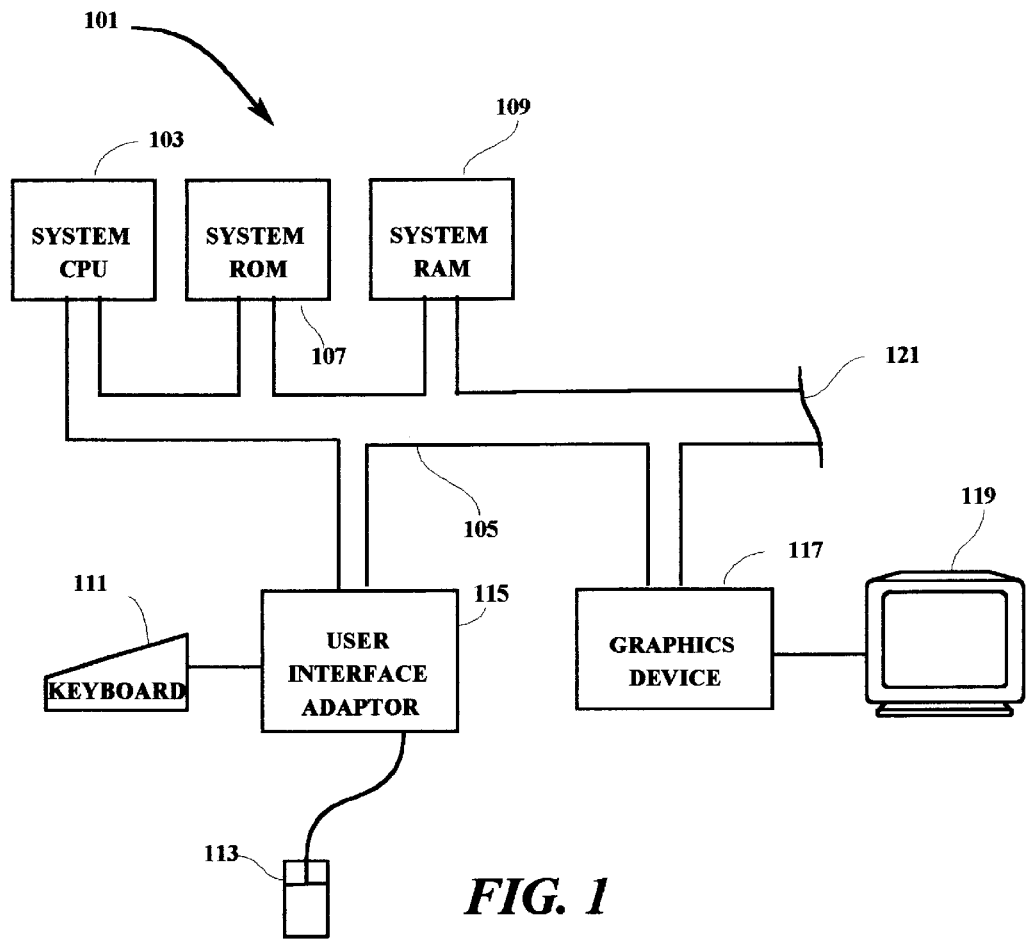
FIG. 1 is a block diagram of a computer system including a graphics system.

With reference to FIG. 1, the various methods discussed above may be implemented within a typical computer system or workstation 101, for example, which may include a graphics sub-system or device 117. A typical hardware configuration of a workstation which may be used in conjunction with the present invention is illustrated and includes a central processing unit (CPU) 103, such as a conventional microprocessor, and a number of other units interconnected through a system bus 105. The bus 105 may include an extension 121 for further connections to other workstations or networks, and the like. The workstation shown in FIG. 1 includes system random access memory (RAM) 109, and a system read only memory (ROM) 107. The system bus 105 is also typically connected through a user interface adapter 115 to a keyboard device 111 and a mouse or other pointing device 113. Other user interface devices such as a touch screen device (not shown) may also be coupled to the system bus 105 through the user interface adapter 115. The graphics device 117 is also shown connected between the system bus 105 and a monitor or display device 119. Since the workstation or computer system 101 within which the present invention is implemented is, for the most part, generally known in the art and composed of electronic components and circuits which are also generally known to those skilled in the art, circuit details beyond those shown in FIG. 1, will not be explained to any greater extent than that considered necessary as illustrated above, for the understanding and appreciation of the underlying concepts of the present invention and in order not to obfuscate or distract from the teachings of the present invention.

Figure 2:
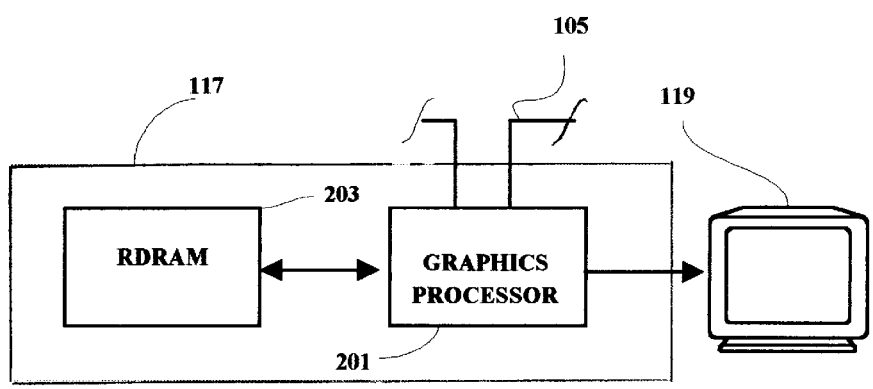
FIG. 2 is block diagram of the graphics device shown in FIG. 1.

In FIG. 2, the system bus 105 is shown connected to the graphics device or subsystem 117. The graphics device 117 may include, for example, a graphics processor 201 which is arranged to process, transmit and receive information or data from a relatively fast local frame buffer unit which in the present example is a RDRAM memory 203. The frame buffer unit or RDRAM 203 contains frame display information which is accessed by the graphics processor 201 which, in turn, is connected to a display device 119. The display device 119 is operable to provide a graphics display of the information stored in the frame buffer 203 as processed by the operation of the graphics processor 201. Although the present example shows a graphics processor 201 separate from a system CPU 103, it is understood that the present invention is not limited to having a separate graphics processor but rather also includes systems in which the methodology taught herein is implemented within or as part of a single system CPU or other larger system chip or integrated circuit.

In FIG. 3, a memory map of a RDRAM memory includes two Non-Free Space (NFS) areas 301 and 305 which may be occupied by video buffer memory and "Z" Buffer memory for example. The memory map also includes two Free Space (FS) areas 303 and 307 which are unused open memory areas at a given point in time. The term "texture map" or "TM" is used herein to designate a block or chunk of memory spaces which contains bytes of information related to various graphics primitives or basic drawing elements which may be presented upon a certain pixel area on a display screen. The TMs, for example, may contain transparency or shading information about a triangularly shaped primitive drawing element of a known size. The texture maps will be of varying and predetermined configurations, i.e. memory area sizes and shapes, and such TMs or blocks of information need to be stored and accessed or called when the primitive with which the TM is associated, is called for processing by the graphics program. This drawing process by which primitives and their associated TMs are called for display, may occur continually during the graphics processing function and accordingly there are many access and storage functions occurring at a rapid pace. If the local graphics RDRAM memory is fully utilized, additional TMs are sent to the Host or System memory for storage and retrieval. In accordance with the present invention, the TMs are characterized by call frequency of their related primitive and also by TM size. The system may prioritize storage of the TMs in any manner to best suit the system to which the present storage and retrieval method is applied. In the present example, the TMs are characterized first by call frequency and then by size. Those TMs that apply to primitives that are most frequently used by a program have first priority and are stored first in RDRAM. Thereafter, TMs are stored in RDRAM on a size basis so that, among the TMs with substantially the same call frequency priority, larger TMs, which will require more accesses for a complete file transfer, will be first stored in the RDRAM and when the RDRAM is full, the remaining TMs will be sent to the Host or System memory for storage. In that manner, the most frequently used TMs will be provided with the least amount of access time and also the largest sized blocks or TMs, i.e. those with largest amounts of resolution or bytes-per-pixel (BPP) information, which may require multiple accesses, will also be stored in, and accessed from, fast RDRAM memory on a space available priority basis. In some cases, a weighting factor is used to increase the priority for small TMs. If, for example, the same area in fast memory may be taken by twelve texture maps having a first relatively lower priority of "1", or by only one larger texture map having a second higher priority of "2", the best usage of the fast memory would be to store the twelve texture maps in fast memory even though they have a relatively lower priority. In that case the higher priority TM would be stored in relatively slower system memory. In that way, more accesses to memory are to fast RDRAM because more TMs are in RDRAM despite the lower priority of those TMs.

It is also noted that programs and applications will vary in the number of times that certain primitives are called or used. Accordingly, the number of uses of the TMs is tracked and when one of the TMs in Host memory for example begins to be used more frequently than a TM in the RDRAM memory, a re-shuffle or swap can occur to have the TMs change locations in order to keep the most frequently used TMs in the fastest memory available. Depending upon the application, the frequency with which the re-shuffling of memory locations can occur can also be varied. Moreover, the disclosed method also accommodates multiple priorities and allows for resolution of mixed priority-size TMs on a sub-system basis.

The underlying methodology as illustrated in the present example, accomplishes the optimal storage of texture maps or TMs, of different resolutions and BPP into RDRAM by attempting to fit the largest TM into the smallest single block of free RDRAM space (FS) so that if a larger texture needs to registered later, the larger texture will have a higher probability of fitting into the RDRAM. For example, the RDRAM configuration shown in FIG. 4 includes three non-free space (NFS) blocks 501, 503 and 505. In FIGS. 4–8, corresponding numerals refer to corresponding parts in all of the illustrations. NFS block 501 occupies the upper left-hand corner of the RDRAM and NFS 503 is of corresponding height and occupies the area directly to the right of NFS 501 with reference point "A" between NFS areas 501 and 503, and reference point "C" at the right side of the NFS block 503. NFS 505 begins directly below NFS 501 and has a corner vertex or reference point "B" defining its lower-most and right-most vertex. NFS areas 501–505 are occupied with information relating to other functions of a graphics system and are unavailable to accept TMs or additional blocks of information. There is, however, free space (FS) in the RDRAM as indicated in the lower right-hand corner 407. For purposes of the present example, it is assumed that there are many TMs of various sizes and call or use frequencies (the number of times a texture is used, i.e. not the number of times a texture is registered but rather the number of polys that use the texture or TM) which need to be stored for optimized access.

In FIG. 5, the FS 407 of FIG. 4 is divided to provide two areas of free space "FS2" 507 and "FS1" 509. In FIG. 6 The free space 407 is divided in a different manner to define free spaces FS3 601 and FS4 603. FIG. 8 illustrates the assignment of a TM within the area of FS4 603 and the reconfiguration of the RDRAM into NFS 801 (occupied by the assigned TM) and the remaining free space 803 and 804. FIG. 5 through FIG. 7 illustrate the operation of an exemplary routine for finding free space in a RDRAM while FIG. 8 is useful in explaining a "Put" routine for installing a TM to a free space and re-mapping the RDRAM. FIG. 5 through FIG. 8 will be referred to in connection with the flowcharts shown in FIG. 13 and FIG. 14.

Figure 9:
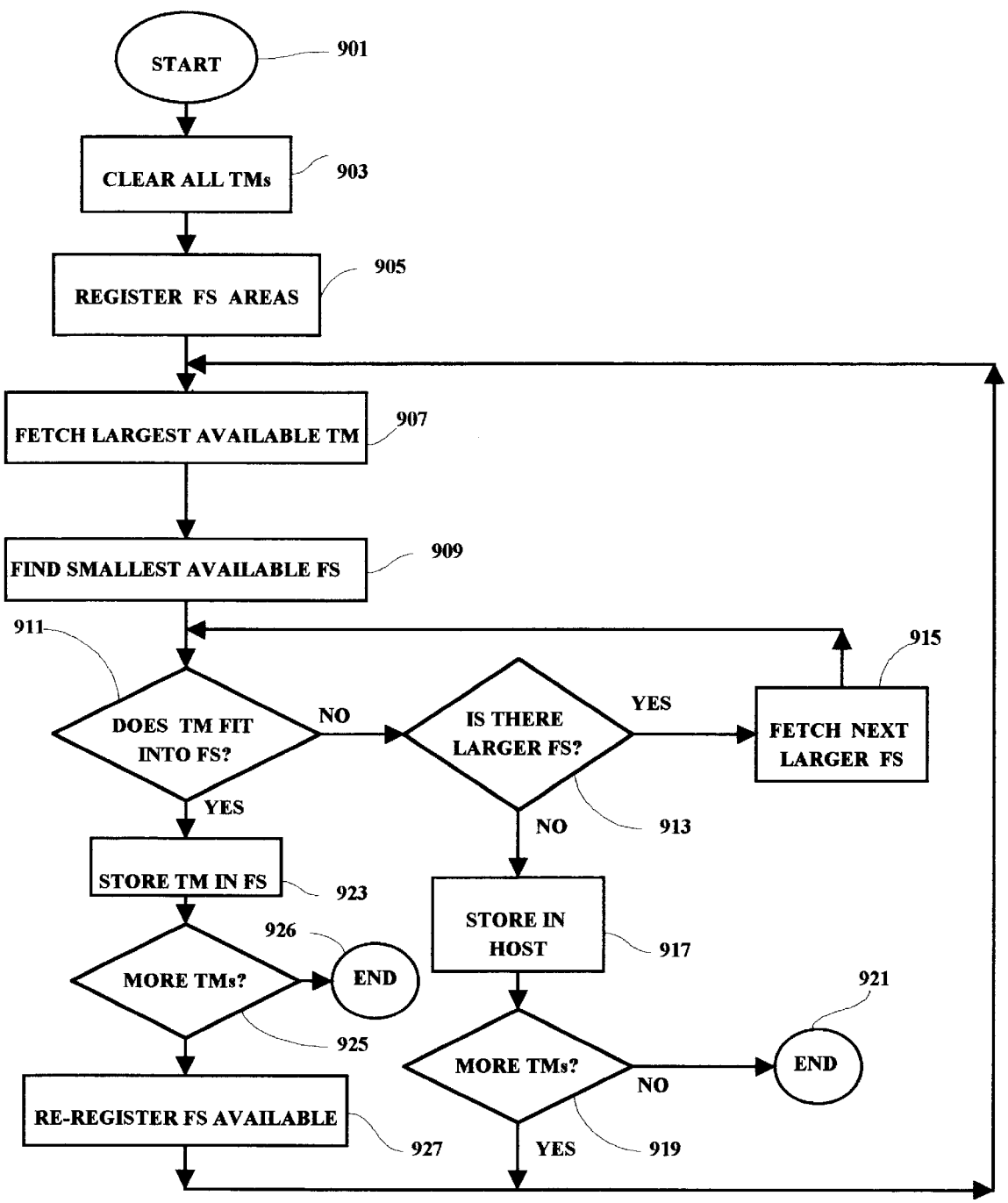
FIG. 9 is a flowchart illustrating a typical operation of the exemplary embodiment.

Referring now to FIG. 9, the overall method implemented in the optimal storing of TMs is illustrated. The program STARTs 901 by clearing all TMs from RDRAM memory 903. Thereafter, all of the FS areas in the RDRAM are registered 905. The next step will fetch 907 the largest available texture map TM to be stored. Thereafter, the program will find 909 the smallest available free space FS in the RDRAM. A determination is then made 911 as to whether or not the largest available TM fits into the smallest available free space FS. If the TM does not fit, a determination is then made as to whether or not there is a larger free space available 913 in the RDRAM. If a larger free space is available, the next larger free space is fetched 915 to determine if the TM will fit 911. That loop is repeated until a large enough free space is found, and the TM is stored 923. Otherwise, if a large enough free space is not found and there are no larger free spaces available 913 then the TM is sent to the Host or system memory for storage 917. At that point, a determination is made as to whether or not there are any more TMs 919. If not, the method will end 921. If there are more TMs for storage, the method repeats by fetching the largest of the available TMs 907. In each case, when a TM is stored in a free space 923, a determination is made as to whether or not there are more TMs 925. If there are no more TMs, the process will end 926. Otherwise, if there are more TMs, the method will re-register or re-order the free space available 927 after deducting the newly stored TM, and continue by fetching the largest of the available TMs 907.

Figure 10:
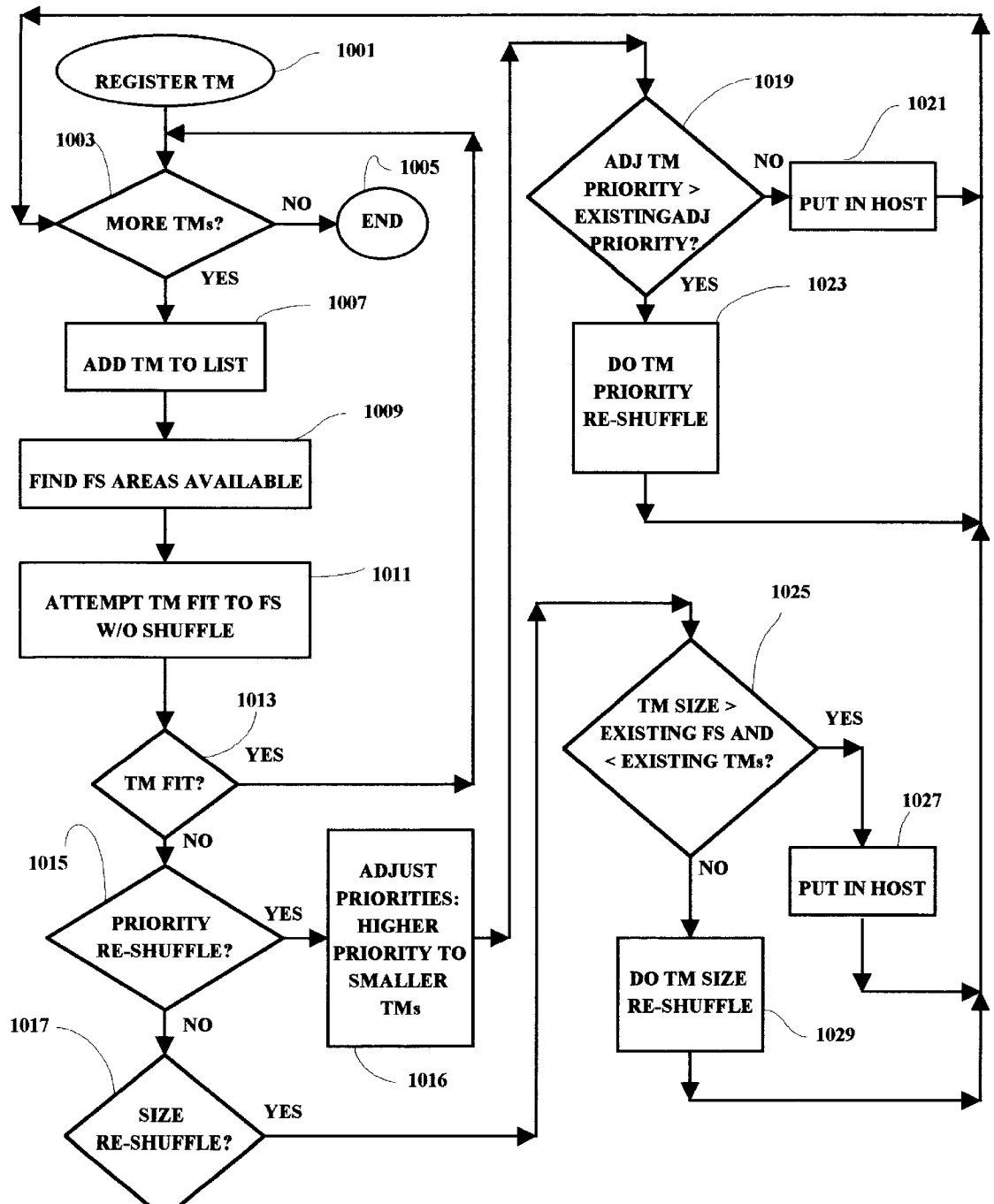
FIG. 10 is a flowchart illustrating one aspect of the present method.

In FIG. 10, the method of registering TMs is illustrated in more detail. The TM priority and size factors are also illustrated as they relate to the need and frequency of the re-shuffle or priority re-ordering process. The Register TM routine 1001 is called for example, when the fetch largest available TM 907 (FIG. 9) function is invoked. First a determination is made as to whether there are more TMs to be registered 1003. If not the process ends 1005. If there are more TMs, one TM is added to the list 1007. Next an available FS area is found 1009 and an attempt is made to fit the TM into the FS area 1011 without a re-shuffle of priorities or size. If the TM fits 1013, the TM remains on the TM list and the process returns to determine if there are any more TMs 1003. If, however, the TM does not fit, the method determines whether or not a priority re-shuffle 1015 is needed or programmed, i.e. if the TM one which is used more frequently than others. If a priority re-shuffle is not called for then the program determines whether or not a size re-shuffle is needed or programmed 1017, i.e. if the size of the TM is greater than a predetermined size and would require several accesses to transfer the entire TM. In the present example it is assumed that a size re-shuffle will be done at that point in the program in all cases although the method may provide other options if a size re-shuffle is not deemed appropriate at that point in the process. If either a priority re-shuffle or a size re-shuffle is called for, then the method continues to carry out the appropriate function.

For a priority re-shuffle, priorities are weighted for small TMs 1016, i.e. priorities are adjusted to give a higher priority to smaller TMs. A determination is then made as to whether or not the adjusted TM priority of the TM being processed is greater than the adjusted priorities of the TMs already existing in the RDRAM 1019. If not, the TM is put into the Host or system memory 1021 and a determination is made as to whether or not there are any more TMs to be registered 1003 and if so the process will add the next TM to the list 1007 and continue as hereinbefore explained. If, however, the TM being processed has a priority greater than the priorities of the TMs already existing in the RDRAM 203, then the TM priority is re-shuffled 1023 to include the TM being processed and drop out a previously stored TM with a lower priority.

If a size re-shuffle is called for, then a determination is made as to whether or not the TM size is greater than the sizes of existing free spaces and smaller than the existing and previously RDRAM stored TMs 1025. The result is positive, the TM is put into the Host memory 1027 and the process returns to determine if there are more TMs 1003. If, however, the size of the TM being processed is not greater than the existing free spaces and not less than the previously RDRAM stored TMs, then a size re-shuffle is initiated 1029 and the TM being processed is put into the RDRAM replacing a previously stored smaller TM.

The priority re-shuffle method 1023 is illustrated in more detail in connection with FIG. 11. When the process begins 1101 priorities are assigned 1103 to the TMs and the TMs are sorted 1105 according to priorities. Next, attempts are made to fit different percentages of the top priority TMs into the available free space by size by using a fit-by-size reshuffle method 1107, until all the TMs within this top percentage fit, at which time the process ends 1109.

In FIG. 12, the size re-shuffle routine 1029 of FIG. 10 is shown in more detail. After the routine is initiated 1201, all of the non-free space NFS memory areas are cleared 1203. Next all of the available free space FS areas are cleared 1205, and the find available free space function is executed 1207. Next, the method gets the largest of the available TMs 1209 and attempts to put the TM into the RDRAM 1211. If there is a fit 1213, i.e. if the largest available TM fits into RDRAM without further action, then the program determines if there are more TMs 1215. If there are more TMs then the program returns to get the largest TM available 1209, and that loop is continued until either there is no fit 1213 or there are no more TMs 1215. When there is a fit but there are no more TMs 1215, the routine ends 1225. When there is no fit 1213, the program will try to UV mux the TM 1217.

A UV mux is a method by which the dimensions of the TM are modified while preserving the total size of the TM. For example, a TM can be UV muxed by halving its height and doubling its width. In that way the TM has the same size and information but a different dimension and may fit more easily into free space that is available in RDRAM.

Next, if there is no fit 1219 of the TM into the RDRAM, the TM is sent to the Host memory. If there is a fit 1219 or if the TM is sent to the Host memory 1221 then the program checks for more TMs 1223 and loops back to the get the largest TM available block 1209. The loop is terminated when there are no more TMs available 1223.

Figures 13, 14:
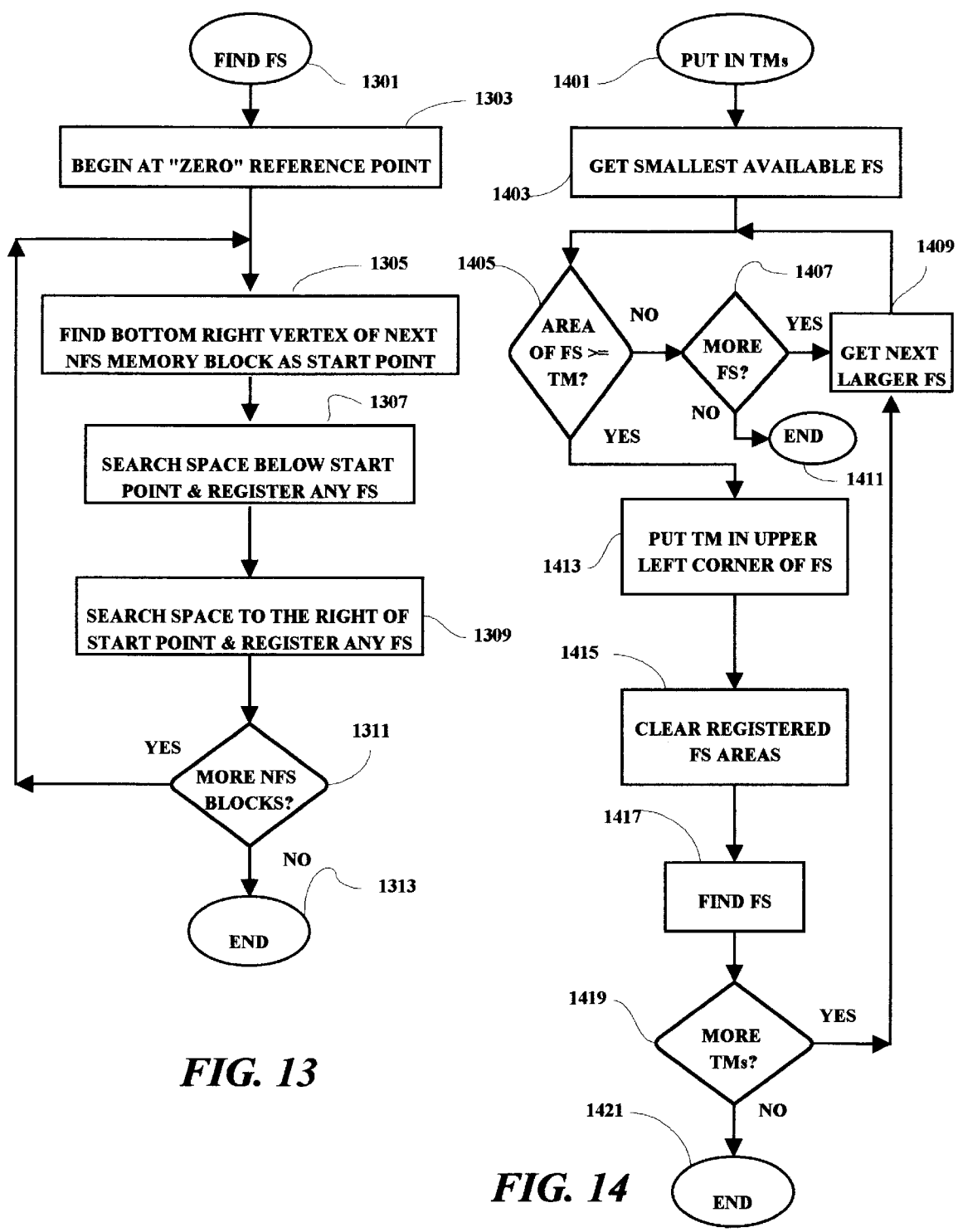
FIG. 13 is a flowchart illustrating a "Find" function implemented in the present example.
FIG. 14 is a flowchart illustrating a "Put" routine implemented in the disclosed example.

In FIG. 13, the find free space FS routine is shown in more detail. Reference is also made to FIG. 5 through FIG. 7. When the find FS routine is called 1301, the process begins at a designated "zero" reference point 1303. That point may vary depending upon the system and RDRAM limitations. In the present example, the bottom right vertex of the next NFS memory block is located as a start point 1305. This corresponds to point "A" in FIG. 5. Next, the space directly below the start point is examined and any free space FS is registered 1307. For example, FS1 in FIG. 5 would be registered. Next, the space to the right of the start point is checked and any FS there is also registered 1309. The program then determines if there are any more NFS blocks 1311 and if there are, the routine returns to find the bottom right vertex of the next NFS memory 1305. For example, in FIG. 6 the program would return to point "B". Next the program would locate the FS below "B" i.e. FS4, and then to the right of "B" i.e. FS3. FS3 and FS4 could also be broken down in the manner as shown in FIG. 7 with FS2 and FS1. The various possible sub-divisions of the free space will be tracked and referred to in the "fitting" tests performed during the routines. The method shown is one method of probing the free memory space and dividing the free space into free space segments, it being understood that there are other methods of accomplishing the noted function and all such methods are considered within the broader scope of the present invention. After each search from each corner of NFS in the RDRAM, a check is made as to whether or not there are more NFS blocks 1311. If there are more NFS blocks, the process returns to find the bottom right vertex (in the present example) as a start point 1305 for the next sub-division of the free space. When there are no more NFS blocks 1311 the routine ends 1313.

FIG. 14 illustrates the routine that puts the TMs into RDRAM. This is also schematically illustrated in FIG. 8. As the routine is initiated 1401 the smallest available free space FS is determined 1403. Next a test is made to determine whether the area of the free space is greater than or equal to the texture map or TM 1405. If the free space area passes that test, the TM is placed into the upper left corner of the free space 1413. Referring to FIGS. 6–8, FS4 is defined to be smaller than FS1 so that the TM 801 would be placed into the FS4 of FIG. 6 as shown in FIG. 8.

If the area of the FS is not greater than or equal to the TM 1405, then a check is made to determine if there is more free space 1407, and if there is then the next larger free space area is referenced 1409 and the FS area loop 1405, 1407 is re-applied. The routine will end 1411 when no more FS areas are found 1407. After a TM is placed in a FS of the RDRAM 1413, the registered FS areas are cleared 1415 and the find free space function 1417 is effected. Thereafter, if there are more TMs 1419 the routine returns to get the next larger FS and loop through the FS area loop 1405, 1407. When there are no more TMs 1419, the routine ends 1421.

Figures 15, 16:
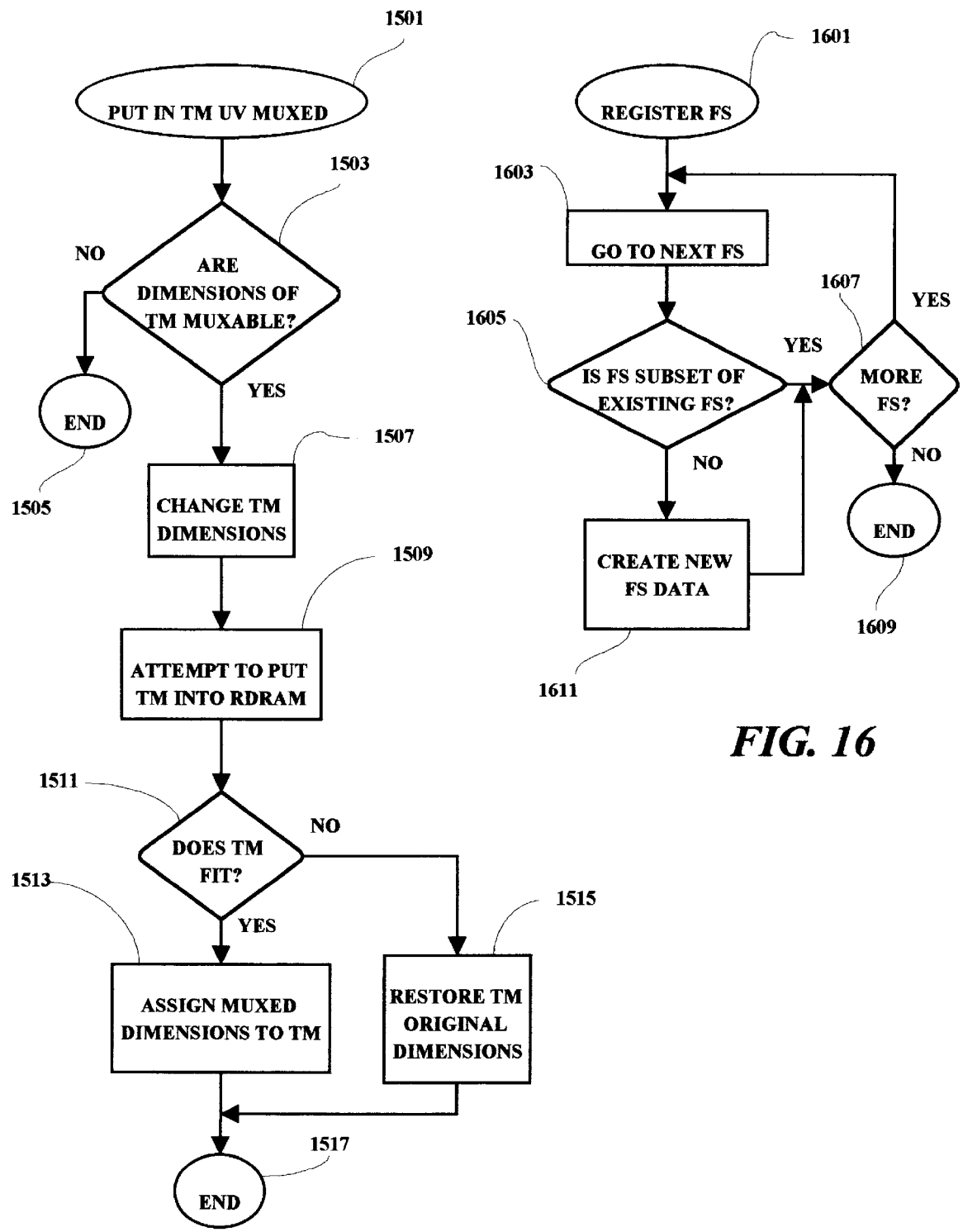
FIG. 15 is a flowchart showing a "muxed" routine implemented in the present example.
FIG. 16 is a flowchart showing a "Register" function implemented in the disclosed method.

The put in TM UV muxed process is shown in more detail in FIG. 15. When the routine is initiated 1501 a determination is made as to whether or not the dimensions of the TM are muxable 1503. If not, the routine will end 1505. If, however, the dimensions are muxable 1503 the dimensions of the TM are changed 1507 and an attempt is made to put the TM into the RDRAM 1509. If the TM does not fit 1511 then the original dimensions of the TM are restored 1515 and the routine ends. If the TM with the changed dimensions does fit into the RDRAM 1511 then the muxed dimensions are assigned to the TM 1513 and the routine ends.

FIG. 16 illustrates the register FS method. When the process begins 1601, the next FS is referenced 1603 and a determination is made as to whether or not the particular FS is a subset of existing designated FS areas 1605. If it is a subset then a determination is made if there are more FS areas 1607 and if there are, then the process loops back to get the next FS 1603. If the current FS is not a subset of existing FS 1605 then new FS data file is created 1611 and a check is made for more FS areas 1607. The routine ends 1609 when there are no more FS areas.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for storing a group of blocks of information in a first memory, each of said blocks of information being associated with an element of an image which may be displayed, said method comprising:

marking each of the blocks according to at least one predetermined characteristic of the information; and storing said blocks in said first memory in accordance with a predetermined priority schedule for said characteristic, wherein said blocks of information comprise texture maps and said elements are pixels of a display system, and wherein said first memory is comprised of free space areas and non-free space areas, said non-free space areas representing first memory area which is not available for storing said blocks of information, said free space areas being representative of first memory space available for storing said blocks of information, said method further including:

registering all free space areas of said first memory;

fetching a largest one of said blocks of information;

finding a smallest one of said free space areas;

attempting to fit said largest one of said blocks into said smallest one of said free space areas.

2. The method as set forth in claim 1 wherein said method further includes a step of:

iteratively fetching a next larger free space area if said largest one of said blocks of information does not fit into said smallest one of said free space areas.

3. The method as set forth in claim 2 wherein said method further includes:

storing said largest one of said blocks of information into said smallest one of said free space areas if said largest one of said blocks of information is determined to fit into said smallest one of said free space areas.

4. The method as set forth in claim 3 wherein said method further includes:

storing said largest one of said blocks of information into a second memory when said largest one of said blocks of information in unable to fit into said smallest one of said free space areas and there are no larger free space areas available in said first memory.

5. The method as set forth in claim 4 wherein said first memory is faster than said second memory.

6. The method as set forth in claim 5 and further including:

determining if there are more of said blocks of information available after each time one of said blocks of information is stored; and iteratively repeating said steps of registering, fetching, finding and attempting, when it is determined that more of said blocks of information are available, said method being further operable to continue until it is determined that there are no more blocks of information available and all available blocks of information have been stored in one of said first and second memories.

7. The method as set forth in claim 6 wherein said method further includes repeating said registering of said free space areas after each time one of said blocks of information is stored in said free space area.

8. The method as set forth in claim 1 wherein said step of registering further includes;

finding a free space area in said first memory; and selectively creating a new free space file when any of said free space areas found in said first memory are determined not to be a subset of a previously established free space area.

9. The method as set forth in claim 8 wherein said finding step further includes:

determining a zero reference starting point in said first memory;

finding a lower right side vertex of a non free space memory area adjacent to said zero reference starting point; and searching memory space below said starting point and registering any free space found.

10. The method as set forth in claim 9 and further including:

searching memory space to the right of said start point and registering any free space found.

11. The method as set forth in claim 10 and further including repeating said step of registering until all non-free space areas of said first memory have been registered.

12. The method as set forth in claim 1 wherein after said step of attempting, said method further includes:

re-shuffling said texture maps in said first memory whenever said largest one of said blocks does not fit within said smallest one of said free space areas.

13. The method as set forth in claim 12 wherein said re-shuffling step comprises size re-shuffling said texture maps based upon size of said texture maps, said size re-shuffling being accomplished whenever texture map size is greater than existing free space in said first memory but less than the existing texture maps in said first memory.

14. The method as set forth in claim 13 wherein said method is further operable to put said texture map in a second memory whenever said texture map size is not greater than existing free space and less than existing texture maps.

15. The method as set forth in claim 14 wherein said first memory has a faster access time than said second memory.

16. The method as set forth in claim 14 wherein said size re-shuffling step includes:

clearing non-free space areas in said first memory;
   clearing available free space areas in said first memory;
   finding available free space areas in said first memory;
   getting a largest one of available texture maps;
   attempting to put said largest one of said texture maps in said first memory; and
   putting said largest one of said texture maps in a second memory if said largest one of said texture maps does not fit in said first memory.

17. The method as set forth in claim 16 wherein said method further includes attempting to UV mux said largest one of said texture maps when said largest one of said texture maps does not fit in said first memory.

18. The method as set forth in claim 17 wherein said muxing step includes:

determining if dimensions of said texture map are muxable;
   changing dimensions of said texture map when it is determined that said dimensions are muxable;
   attempting to put said muxed texture map into said first memory; and
   assigning said muxed dimensions to said texture map if said muxed texture map fits into said first memory.

19. The method as set forth in claim 18 wherein said method further includes:

restoring original dimensions to said texture map when said muxed texture map does not fit into said first memory.

20. The method as set forth in claim 12 wherein said re-shuffling step comprises priority re-shuffling said texture maps based upon a priority of said texture maps, said priority re-shuffling being accomplished whenever texture map priority is higher than priorities of existing texture maps in said first memory.

21. The method as set forth in claim 20 wherein said method is further operable to put said texture map in a second memory whenever said priority of said texture map is not greater than priorities of texture maps previously established in said first memory.

22. The method as set forth in claim 21 wherein said first memory has a faster access time than said second memory.

23. The method as set forth in claim 20 wherein said priority re-shuffling step includes:

assigning priorities to said texture maps;
   sorting said texture maps by said assigned priority; and
   iteratively attempting to fit differing percentages of said texture maps having higher ones of said priorities into free space of said first memory until a predetermined number of fits occurs.

24. A storage medium including machine readable indicia, said storage medium being selectively coupled to a reading device, said reading device being coupled to processing circuitry, said reading device being selectively operable to read said machine readable indicia and provide program signals representative thereof, said program signals being effective to cause said processing circuitry to store a group of blocks of information in memory, wherein each of said blocks of information is associated with an element of an image which may be displayed, said memory comprising at least first and second memory devices, said first memory device being faster than said second memory device, said program signals being further effective to accomplish the steps of:

marking each of the blocks according to at least a first predetermined characteristic of the information, said first predetermined characteristic of said information being related to a size aspect of said blocks of information; and storing said blocks in said first memory in accordance with a predetermined priority schedule for said first predetermined characteristic, wherein said blocks of information comprise texture maps and said elements are pixels of a display system, and wherein said first memory is comprised of free space areas and non-free space areas, said non-free space areas representing first memory area which is not available for storing said blocks of information, said free space areas being representative of first memory space available for storing said blocks of information, said program signals being further effective for:
      registering all free space areas of said first memory;
      fetching a largest one of said blocks of information;
      finding a smallest one of said free space areas;
      attempting to fit said largest one of said blocks into said smallest one of said free space areas.

25. A computer based graphics station, including a computer system comprising a main bus, a system memory and a display device, and a graphics subsystem, said graphics subsystem comprising a graphics processor device connected to said main bus and to said display device, said graphics subsystem further including a graphics memory coupled to said graphics processor, said graphics memory being faster than said system memory, said graphics subsystem being selectively operable to provide program signals, said program signals being effective to cause said graphics station to store a group of blocks of information in said graphics memory, wherein each of said blocks of information is associated with an element of an image which may be displayed, said program signals being further effective to accomplish the steps of:

marking each of the blocks according to at least a first predetermined characteristic of the information, said first predetermined characteristic of said information being related to a size aspect of said blocks of information; and storing said blocks in said graphics memory in accordance with a predetermined priority schedule for said first predetermined characteristic, wherein said blocks of information comprise texture maps and said elements are pixels of the display device, and wherein said graphics memory is comprised of free space areas and non-free space areas, said non-free space areas representing graphics memory area which is not available for storing said blocks of information, said free space areas being representative of graphics memory space available for storing said blocks of information, said program signals being further effective for:
      registering all free space areas of said graphics memory;
      fetching a largest one of said blocks of information;
      finding a smallest one of said free space areas;
      attempting to fit said largest one of said blocks into said smallest one of said free space areas.

* * * * *